United States Patent
Thompson et al.

(10) Patent No.: US 11,198,249 B2
(45) Date of Patent: Dec. 14, 2021

(54) METHOD OF JOINING ADDITIVELY MANUFACTURED COMPONENTS

(71) Applicant: General Electric Company, Schenectady, NY (US)

(72) Inventors: Mary Kathryn Thompson, North Huntingdon, PA (US); Christopher Barnhill, Cincinnati, OH (US); Travis Gene Sands, Lebanon, OH (US); James Kenton Pullins, Madeira, OH (US); Mark Pezzutti, Mason, OH (US)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 16/049,209

(22) Filed: Jul. 30, 2018

(65) Prior Publication Data

US 2020/0031045 A1    Jan. 30, 2020

(51) Int. Cl.
*B29C 64/188*    (2017.01)
*B29C 64/165*    (2017.01)
(Continued)

(52) U.S. Cl.
CPC .......... *B29C 64/188* (2017.08); *B29C 64/135* (2017.08); *B29C 64/165* (2017.08);
(Continued)

(58) Field of Classification Search
CPC ........ B29C 66/73753; B29C 66/73754; B29C 66/7375; B29C 65/14; B29C 65/1406; B29C 65/1435; B29C 65/1454; B29C 64/171; B29C 64/176; B29C 64/182; B29C 64/188; B29C 64/393; B33Y 50/02; B33Y 10/00
See application file for complete search history.

(56) References Cited

U.S. PATENT DOCUMENTS 4,752,498 A    6/1988 Fudim
4,828,641 A    5/1989 Werther et al.
(Continued)

OTHER PUBLICATIONS

A. Kertik, "How to cut 3D models in Materialise Magics", Materialise Software Academy, Apr. 17, 2018, downloaded Jan. 28, 2021 from https://www.materialise.com/en/academy-software/resources/magics/tutorial-how-to-cut-3d-models.*

*Primary Examiner* — George R Koch
*Assistant Examiner* — Jimmy R Smith, Jr.
(74) *Attorney, Agent, or Firm* — Dinsmore & Shohl LLP

(57) ABSTRACT

A method for producing a component from two or more sub-components includes the steps of: producing each of the sub-components using an additive manufacturing process in which a resin, which is radiant-energy-curable, is partially cured using a selective application of radiant energy, wherein each sub-component includes a joint surface in which the resin is partially cured which is cured to a lesser degree than the remainder of the respective sub-component, so as to leave the joint surfaces in a condition suitable for bonding; assembling the sub-components with their respective joint surfaces in mutual contact; and performing a secondary cure of the partially-cured resin at the joint surfaces using an application of radiant energy, so as to further cure the partially-cured resin and bond the sub-components to each other, thereby forming the component.

11 Claims, 7 Drawing Sheets

(51) Int. Cl.

| | |
|---|---|
| *B29C 64/171* | (2017.01) |
| *B29C 64/393* | (2017.01) |
| *B29C 65/00* | (2006.01) |
| *B29C 64/135* | (2017.01) |
| *B33Y 10/00* | (2015.01) |
| *B33Y 50/02* | (2015.01) |
| *B29C 65/14* | (2006.01) |
| *B33Y 40/00* | (2020.01) |

(52) U.S. Cl.
CPC .......... *B29C 64/171* (2017.08); *B29C 64/393* (2017.08); *B29C 65/14* (2013.01); *B29C 66/12821* (2013.01); *B33Y 10/00* (2014.12); *B33Y 40/00* (2014.12); *B33Y 50/02* (2014.12); *B29C 66/73754* (2013.01)

(56) References Cited

U.S. PATENT DOCUMENTS

| | | |
|---|---|---|
| 4,961,154 A | 10/1990 | Pomerantz et al. |
| 4,999,143 A | 3/1991 | Hull et al. |
| 5,171,490 A | 12/1992 | Fudim |
| 5,182,055 A | 1/1993 | Allison et al. |
| 5,182,056 A | 1/1993 | Allison et al. |
| 5,182,715 A | 1/1993 | Vorgitch et al. |
| 5,192,469 A | 3/1993 | Smalley et al. |
| 5,209,878 A | 5/1993 | Smalley et al. |
| 6,200,646 B1 | 3/2001 | Neckers et al. |
| 6,600,965 B1 | 7/2003 | Hull et al. |
| 6,627,835 B1 | 9/2003 | Chung et al. |
| 6,936,212 B1 | 8/2005 | Crawford |
| 7,636,610 B2 | 12/2009 | Schillen et al. |
| 7,783,371 B2 | 8/2010 | John et al. |
| 7,790,093 B2 | 9/2010 | Shkolnik et al. |
| 7,831,328 B2 | 11/2010 | Schillen et al. |
| 7,892,474 B2 | 2/2011 | Shkolnik et al. |
| 7,894,921 B2 | 2/2011 | John et al. |
| 8,003,040 B2 | 8/2011 | El-Siblani |
| 8,110,135 B2 | 2/2012 | El-Siblani |
| 8,126,580 B2 | 2/2012 | El-Siblani et al. |
| 8,439,671 B2 | 5/2013 | Cinader, Jr. |
| 8,623,264 B2 | 1/2014 | Rohner et al. |
| 8,658,076 B2 | 2/2014 | El-Siblani et al. |
| 8,815,143 B2 | 8/2014 | John et al. |
| 8,932,511 B2 | 1/2015 | Napadensky |
| 9,192,990 B2 | 11/2015 | Meyer et al. |
| 9,205,601 B2 * | 12/2015 | DeSimone ............ B29C 64/393 |
| 9,216,547 B2 | 12/2015 | Elsey |
| 9,415,544 B2 | 8/2016 | Kerekes et al. |
| 9,586,364 B2 | 3/2017 | El-Siblani et al. |
| 9,597,834 B2 | 3/2017 | Cohen et al. |
| 9,782,927 B2 | 10/2017 | Hansen et al. |
| 10,549,489 B2 * | 2/2020 | Ogale ........................ C08J 5/04 |
| 10,751,932 B2 * | 8/2020 | Rudolph ............ B29C 66/73753 |
| 2006/0045787 A1 * | 3/2006 | Jandeska, Jr. ........... B22F 10/00 419/47 |
| 2009/0085257 A1 | 4/2009 | Yang et al. |
| 2013/0309436 A1 * | 11/2013 | Vanimisetti ................ C09J 5/06 428/57 |
| 2015/0123320 A1 | 5/2015 | Joyce |
| 2015/0130114 A1 | 5/2015 | Joyce |
| 2015/0145177 A1 | 5/2015 | El-Siblani et al. |
| 2016/0153102 A1 | 6/2016 | Watson et al. |
| 2016/0167131 A1 | 6/2016 | Weilhammer et al. |
| 2017/0102679 A1 | 4/2017 | Greene et al. |
| 2018/0065295 A1 * | 3/2018 | Alves .................... B33Y 40/00 |
| 2018/0318922 A1 * | 11/2018 | Valls Angles ............ C22C 19/03 |
| 2020/0130256 A1 * | 4/2020 | Debora ................... B32B 27/36 |

\* cited by examiner

METHOD OF JOINING ADDITIVELY MANUFACTURED COMPONENTS

BACKGROUND OF THE INVENTION

This invention relates generally to additive manufacturing, and more particularly to methods for joining together additively manufactured parts.

Additive manufacturing is a process in which material is built up layer-by-layer to form a component. Stereolithography is a type of additive manufacturing process which employs a vat of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the resin or through a transparent object which defines a constrained surface of the resin. Exposure to the radiation cures and solidifies the pattern in the resin and joins it to a previously-cured layer. Other types of additive manufacturing processes supply the resin in other ways (e.g. via a tape or plate) and/or utilize other types of radiant energy sources to solidify patterns in resin.

The maximum build size of existing stereolithography or DLP machines can be limited by the size of the vat, tape, or plate. The maximum build size can also be limited by the ability of the part and its support system to withstand gravitational and other forces during the printing process. In addition, in planar (e.g. DLP-based) photopolymer processes, the build size is often related to the precision through the optics: the smaller the pixel size (i.e. the more precise the process), the smaller the overall build size. Nevertheless, there is often a desire to build very precise parts that are larger than the maximum build size of a given machine or process.

It is known in the art to produce smaller parts which are then joined by adhesive bonding to create a larger whole. However, one problem with such a process is that there is a degree of variability in the joints because adhesives have a non-negligible, unpredictable thickness. For example, adhesives may be on the order of 100 μm (0.1 mm) thick. In contrast, machine feature accuracy for known stereolithography or DLP processes is very good, on the order of 10 μm (0.01 mm). There is a desire to maintain this accuracy level in the finished component. Also, many adhesives for polymers are essentially solvents and their use will result in deformation of or damage to the two parts being joined.

BRIEF DESCRIPTION OF THE INVENTION

At least one of these problems is addressed by an additive manufacturing method in which two or more photopolymer components are made using an additive manufacturing process and then joined to create a larger part.

According to one aspect of the technology described herein, a method for producing a component from two or more sub-components includes the steps of: producing each of the sub-components using an additive manufacturing process in which a resin, which is radiant-energy-curable, is partially cured using a selective application of radiant energy, wherein each sub-component includes a joint surface in which the resin is partially cured to a lesser degree of cure than the remainder of the respective sub-component, so as to leave the joint surfaces in a condition suitable for bonding; assembling the sub-components with their respective joint surfaces in mutual contact; and performing a secondary cure of the partially-cured resin at the joint surfaces using an application of radiant energy, so as to further cure the partially-cured resin and bond the sub-components to each other, thereby forming the component.

According to another aspect of the technology described herein, a method for making a component includes the steps of: producing at least one software build geometry representing two or more sub-components, each of the sub-components having joint surfaces configured for mutual engagement; producing the individual sub-components using an additive manufacturing process in which a resin, which is radiant-energy-curable, is partially cured using a selective application of radiant energy, following the at least one software build geometry, wherein the joint surfaces of each sub-component include partially-cured resin which is cured to a lesser degree than the remainder of the respective sub-component, so as to leave the joint surfaces in a condition suitable for bonding; assembling the sub-components with their respective joint surfaces in mutual contact; and carrying out a secondary curing operation using an application of radiant energy to bond the sub-components at the joint surfaces, thereby forming the component.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
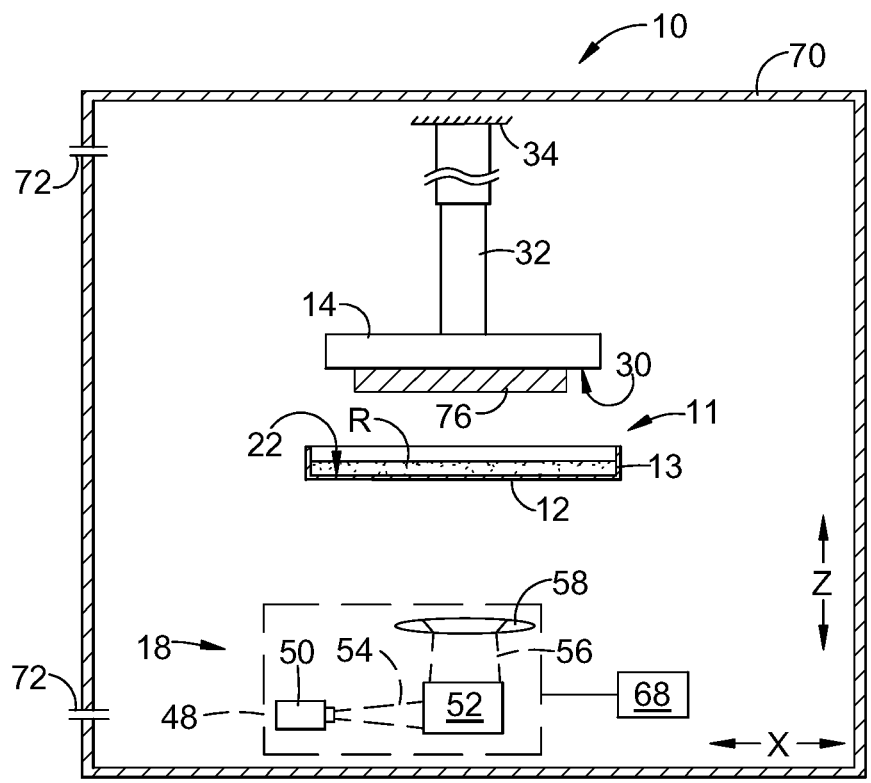
FIG. 1 is a schematic side elevation view of an exemplary additive manufacturing apparatus incorporating a radiant energy apparatus.

Referring to the drawings wherein identical reference numerals denote the same elements throughout the various views, FIG. 1 illustrates schematically an example of one type of suitable apparatus 10 for carrying out an embodiment of an additive manufacturing method as described herein.

The method is primarily intended for use with lower viscosity resins, slurries, and pastes. The method could also be used with higher viscosity resins and/or powders. The illustrated example shows a type of additive manufacturing machine is referred to as a "bottom-up DLP" configuration. It will be understood that other configurations of equipment may be used to carry out the method. Basic components of the exemplary apparatus 10 include a stage 14, a radiant energy apparatus 18, and a vat 11.

The vat 11 includes a floor 12 and a perimeter or walls 13 such that the vat is configured to receive a radiant-energy-curable resin R. The floor 12 is transparent or includes a portion or portions that are transparent. As used herein, the term "transparent" refers to a material which allows radiant energy of a selected wavelength to pass through. For example, as described below, the radiant energy used for curing could be ultraviolet light or laser light in the visible spectrum. Non-limiting examples of transparent materials include polymers, glass, and crystalline minerals such as sapphire or quartz. The floor 12 could be made up of two or more subcomponents, some of which are transparent.

The floor 12 of the vat 11 defines build surface 22 which may be planar. For purposes of convenient description, the build surface 22 may be considered to be oriented parallel to an X-Y plane of the apparatus 10, and a direction perpendicular to the X-Y plane is denoted as a Z-direction (X, Y, and Z being three mutually perpendicular directions). The build surface 22 may be configured to be "non-stick", that is, resistant to adhesion of cured resin.

The stage 14 is a structure defining a planar surface 30 which is capable of being oriented parallel to the build surface 22. Some means are provided for moving the stage 14 relative to the vat 11, and thus to the build surface 22, parallel to the Z-direction. In FIG. 1, these means are depicted schematically as a simple actuator 32 connected between the stage 14 and a stationary support structure 34, with the understanding that devices such as pneumatic cylinders, hydraulic cylinders, ballscrew electric actuators, linear electric actuators, or delta drives may be used for this purpose. In addition to, or as an alternative to, making the stage 14 movable, the vat 11 could be movable parallel to the Z-direction.

The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a "projector" 48, used herein generally to refer to any device operable to generate a radiant energy patterned image of suitable energy level and other operating characteristics to cure the resin R. As used herein, the term "patterned image" refers to a projection of radiant energy comprising an array of individual pixels. Non-limiting examples of patterned imaged devices include a DLP projector or another digital micro-mirror device, a 2D array of LEDs, a 2D array of lasers, or optically addressed light valves. In the illustrated example, the projector 48 comprises a radiant energy source 50 such as a UV lamp, an image forming apparatus 52 operable to receive a source beam 54 from the radiant energy source 50 and generate a patterned image 56 to be projected onto the surface of the resin R, and optionally focusing optics 58, such as one or more lenses.

The radiant energy source 50 may comprise any device operable to generate a beam of suitable energy level and frequency characteristics to cure the resin R. In the illustrated example, the radiant energy source 50 comprises a UV flash lamp.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 52 may be a digital micro-mirror device. For example, the projector 48 may be a commercially-available Digital Light Processing ("DLP") projector.

As an option, the projector 48 may incorporate additional means such as actuators, mirrors, etc. configured to selectively move the image forming apparatus 52 or other part of the projector 48, with the effect of rastering or shifting the location of the patterned image 56 of the build surface 22. Stated another way, the patterned image may be moved away from a nominal or starting location. This permits a single image forming apparatus 52 to cover a larger build area, for example. Means for mastering or shifting the patterned image from the image forming apparatus 52 are commercially available. This type of image projection may be referred to herein as a "tiled image".

Figure 2:
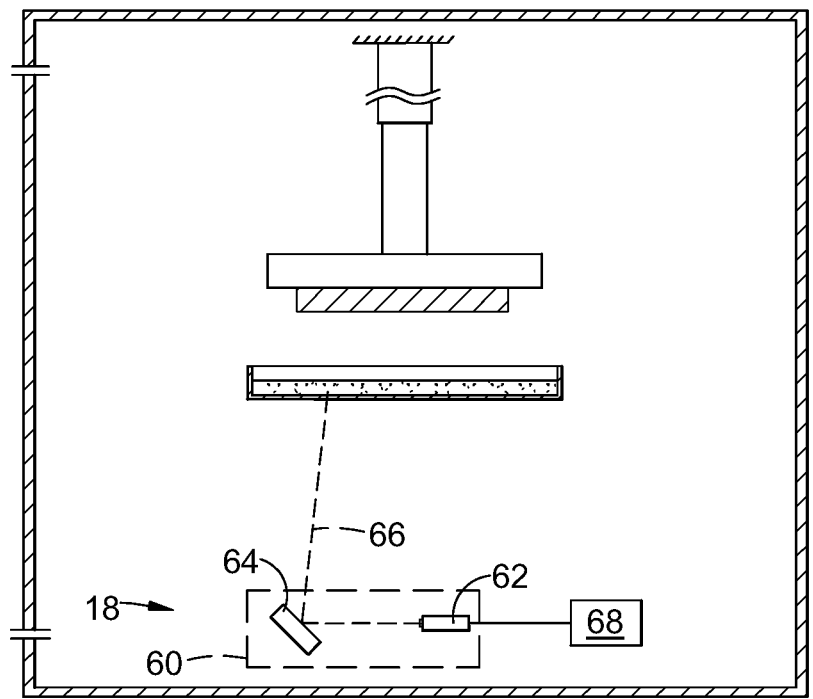
FIG. 2 is a schematic side elevation view of an alternative radiant energy apparatus.

In another exemplary embodiment as shown in FIG. 2, in addition to other types of radiant energy devices, the radiant energy apparatus 18 may comprise a "scanned beam apparatus" 60 used herein to refer generally to refer to any device operable to generate a radiant energy beam of suitable energy level and other operating characteristics to cure the resin R and to scan the beam over the surface of the resin R in a desired pattern. In the illustrated example, the scanned beam apparatus 60 comprises a radiant energy source 62 and a beam steering apparatus 64.

The radiant energy source 62 may comprise any device operable to generate a beam of suitable power and other operating characteristics to cure the resin R. Non-limiting examples of suitable radiant energy sources include lasers or electron beam guns.

The beam steering apparatus 10 may include one or more mirrors, prisms, and/or lenses and may be provided with suitable actuators, and arranged so that a beam 66 from the radiant energy source 62 can be focused to a desired spot size and steered to a desired position in plane coincident with the surface of the resin R. The beam 66 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 68. The controller 68 in FIG. 1 is a generalized representation of the hardware and software required to control the operation of the apparatus 10, the stage 14, the radiant energy apparatus 18, and the various actuators described above. The controller 68 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

Optionally, the components of the apparatus 10 may be surrounded by a housing 70, which may be used to provide a shielding or inert gas atmosphere using gas ports 72. Optionally, pressure within the housing 70 could be maintained at a desired level greater than or less than atmospheric. Optionally, the housing 70 could be temperature and/or humidity controlled. Optionally, ventilation of the housing 70 could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

Generally, the resin R should be flowable. According to the illustrated embodiment, the resin R is preferably a relatively low viscosity liquid that is self-levelling. The resin R can be a liquid having a higher viscosity such that a leveling device such as a doctor blade (not shown) or contact with the stage 14 is required to level the resin R. The composition of the resin R may be selected as desired to suit a particular application. Mixtures of different compositions may be used.

The resin R may be selected to have the ability to out-gas or burn off during further processing, such as the sintering process described below.

The resin R may incorporate a filler. The filler may be pre-mixed with resin R, then loaded into the vat 11. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used.

The filler may be "fusible", meaning it is capable of consolidation into a mass upon via application of sufficient energy. For example, fusibility is a characteristic of many available powders including but not limited to: polymeric, ceramic, glass, and metallic.

The proportion of filler to resin R may be selected to suit a particular application. Generally, any amount of filler may be used so long as the combined material is capable of flowing and being leveled, and there is sufficient resin R to hold together the particles of the filler in the cured state.

It will be understood that, as a precursor to producing a component and using the apparatus 10, the component is represented as a component software model, for example using commercially-available computer-aided design ("CAD") software packages.

Figure 3:
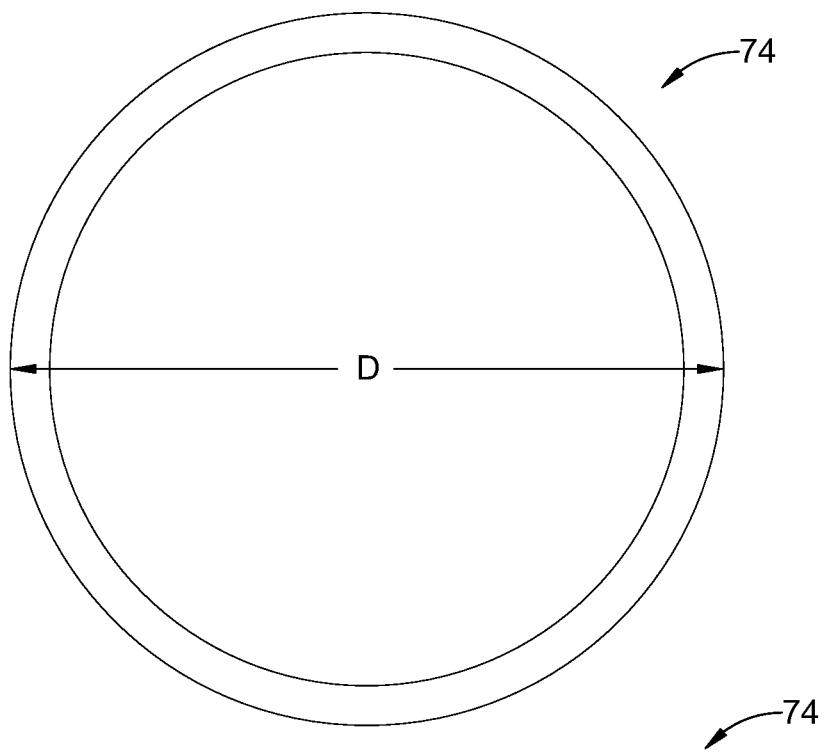
FIG. 3 is a schematic top plan view of a component which can be manufactured using the apparatus shown in FIG. 1.
Figure 4:
FIG. 4 is a side elevation view of the component of FIG. 3.

FIGS. 3 and 4 depict the final desired state of an exemplary component 74. This component 74 is merely an example presented for the purposes of explanation and it will be understood that the principles described herein may be applied to any component which is suitable for additive manufacturing. The exemplary component 74 is ring-shaped and has an outside diameter "D" which may be larger than the vat 11 or other limiting dimension of the apparatus 10, meaning that the component 74 could not be constructed as a single piece using the apparatus 10.

Figure 5:
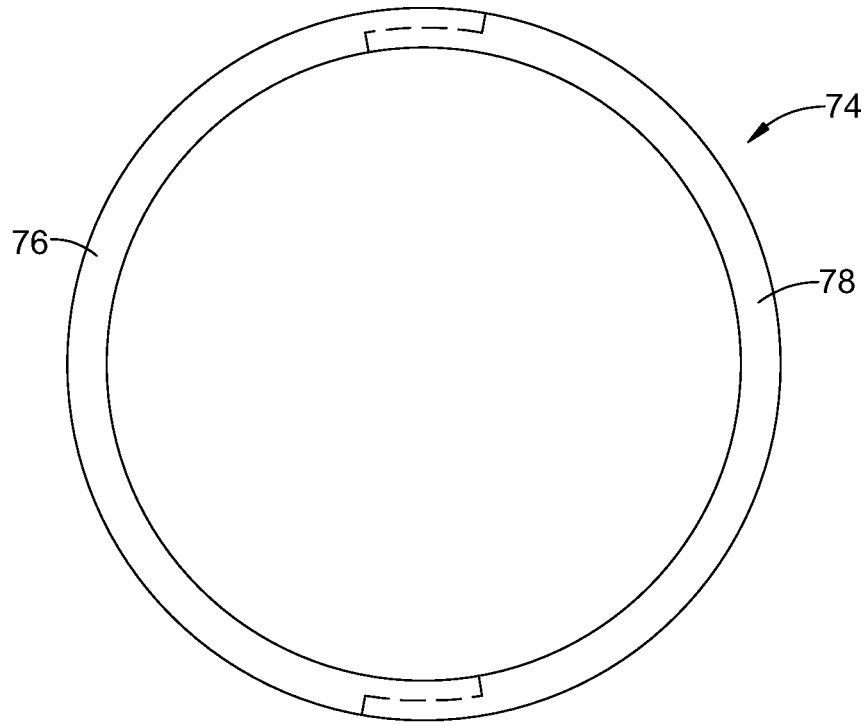
FIG. 5 is a schematic top plan view of the component of FIG. 2, having separation lines superimposed thereupon.
Figure 6:
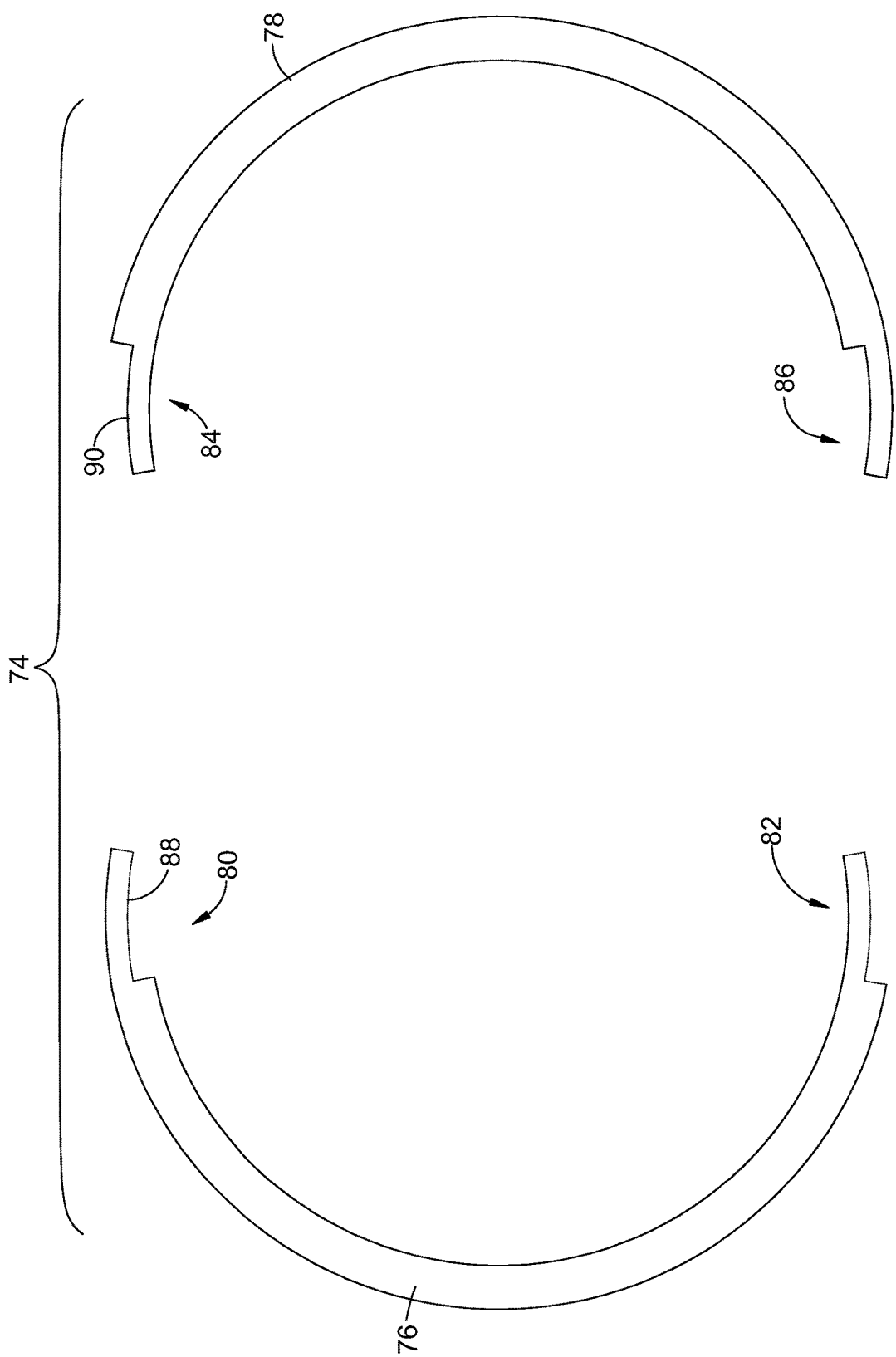
FIG. 6 is an exploded top plan view showing first and second components of the component of FIG. 1.

Accordingly, the modeling process may include a step of subdividing the component 74 into two or more sub-components and translating the component software model into at least one sub-component software model representative of the sub-components In FIGS. 5 and 6, the component 74 is shown as being subdivided into two sub-components referred to as "first and second components" 76, 78 respectively. In practice, the component 74 could be subdivided into any number of sub-components. The individual sub-components may have unique shapes or common shapes as desired to suit a particular application.

In the example shown in FIG. 6, the sub-components 76, 78 are each roughly semi-circular in plan view. The first sub-component 76 has distal ends 80, 82 which correspond to distal ends 84, 86 respectively of the second sub-component 78.

Figure 10:
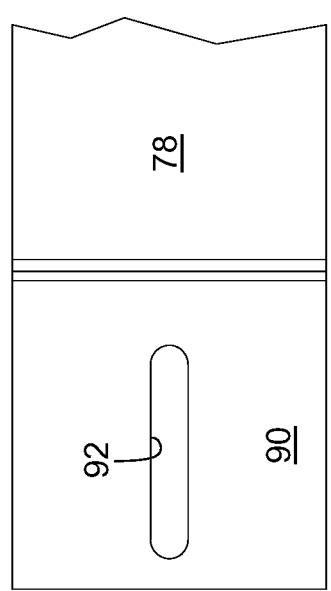
FIG. 10 is a view taken along lines 10-10 of FIG. 9.
Figure 9:
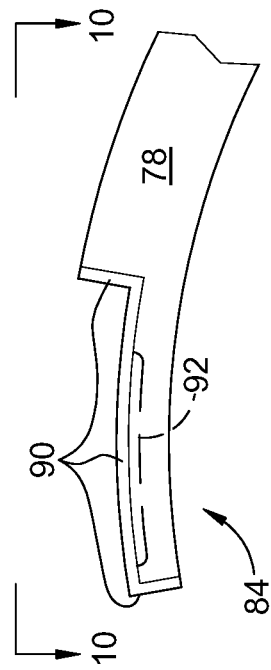
FIG. 9 is an enlarged view of a portion of FIG. 6 illustrating joint surfaces of the second sub-component.
Figure 7:
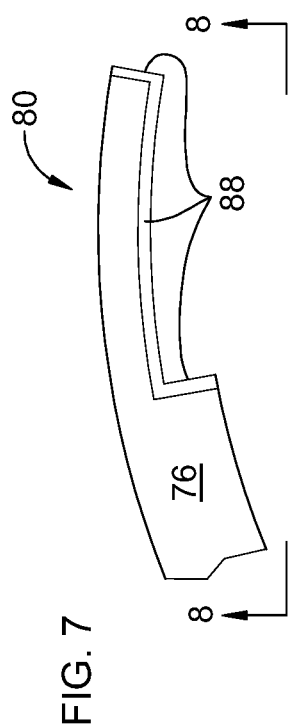
FIG. 7 is an enlarged view of a portion of FIG. 6 illustrating joint surfaces of the first sub-component.
Figure 8:
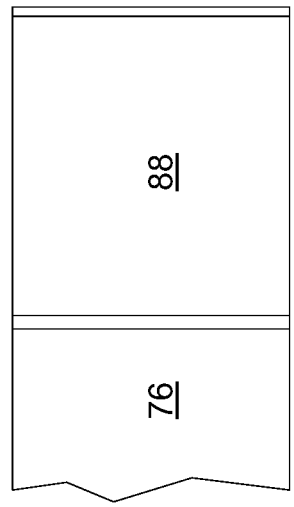
FIG. 8 is a view taken along lines 8-8 of FIG. 7.

The subdivision process includes defining one or more joint surfaces of the individual sub-components. FIGS. 7 and 8 illustrate joint surfaces 88 of the distal end 80 of the first sub-component. FIGS. 9 and 10 illustrate joint surfaces 90 of the distal end 84 of the second sub-component 78 which are shaped and sized complementary to the joint surfaces 88 of the first sub-component 76. The complementary joint surfaces 88, 90 are configured to form a half-lap joint. This is one example of a mechanical joint, i.e., a joint in which the two elements contact each other in more than one plane. The mechanical joint, which is optional, provides some degree of self-alignment or self-fixturing, as well as increasing the bonding surface area as compared to a simpler joint such as a butt joint. Similar joint surfaces are provided at the remaining distal ends 82, 86. As explained further below, the joint surfaces 88, 90 comprise resin which is partially-cured (i.e. intentionally under-cured with respect to the main body) so as to be suitable for a secondary curing and bonding process. The thickness of partially-cured resin at the joint surfaces 88, 90 is exaggerated in the drawings for purposes of clarity.

For any given sub-component, the joint surfaces may be configured as necessary to satisfy various requirements such as structural strength of the joint, ease of production, production cost, process yield, and/or self-fixturing characteristics. Configuration of the joint surfaces may also take into account the direction from which secondary curing energy will be applied, and/or a penetration distance of the secondary curing energy. For example, the joint surfaces may be positioned to ensure that their distance from an exterior of the sub-component is within a penetration distance of the secondary curing energy.

Optionally, the joint surfaces may include negative space or reservoirs, for the purposes of accepting additional uncured photopolymer as a supplementary adhesive. FIGS. 9 and 10 show an example of such a reservoir 92 in the form of a shallow trough.

The process of subdividing the component into sub-components and defining the joint surfaces may be carried out manually.

Alternatively, the process of subdividing the component into sub-components and defining the joint surfaces may be automated using commercially available software such as MAGICS available from Materialise Software of Plymouth, Mich. 48170 USA.

It is noted that component 74 need not be literally subdivided; or stated another way, the design process need not begin with a single unitary component. For example, separate sub-components may be designed and modeled individually, with the design process including the step of defining appropriate joint surfaces which are intended to be assembled together into a larger component.

The sub-component software models are translated into a layered or voxelated software build geometry which represents the sub-components as a stack of planar layers arrayed along the Z-axis, or as a three-dimensional stack of volumetric units or pixels (i.e. "voxels"). Depending on the type of curing method used, each layer may be divided into a grid of pixels. The sub-components may be modeled and/or manufactured as a stack of dozens or hundreds of layers. In advanced embodiments not yet known in the art, the layers may not be planar and/or may stack along more than one axis.

Examples of the operation of the apparatus 10 in production of the example sub-component 76 will now be described in detail with reference to FIG. 1.

Initially, the vat 11 is prepared and filled. As used herein, the term "filling" refers generally to the act of dispensing, loading, or placing resin R into the vat 11 and does not necessarily imply that the vat 11 be completely filled, or filled to maximum capacity. Thus, the act of "filling" may be partial or complete. Means for preparing and filling the vat 11 are known and are outside the scope of the present invention.

Optionally, different layers may comprise two or more different material combinations of resin R and/or filler. As used herein, the term "combination" refers to any difference in either of the constituents. So, for example, a particular resin composition mixed with either of two different filler compositions would represent two different material combinations. For example, one layer may comprise a first combination of resin R and filler, and a second layer may comprise a different combination of resin R and filler. Stated another way, any desired resin and any desired filler can be used for any given layer.

After the material is deposited, the apparatus 10 is positioned to define a selected layer increment. The layer increment is defined by some combination of the depth within the vat 11 to which the resin is filled and the operation of the stage 14. For example, the stage 14 could be positioned such that the upper surface 30 is just touching the applied resin R or the stage 14 could be used to compress and displace the resin R to positively define the layer increment. The layer increment affects the speed of the additive manufacturing process and the resolution of the first sub-component 76. The layer increment can be variable, with a larger layer increment being used to speed the process in portions of a sub-component not requiring high accuracy, and a smaller layer increment being used where higher accuracy is required, at the expense of process speed.

Once the resin R has been applied and the layer increment defined, the radiant energy apparatus 18 is used to cure a two-dimensional cross-section or layer of the sub-component 76 being built. This curing is done with reference to the software build geometry described above.

Where a projector 48 is used, the projector 48 projects a patterned image 56 representative of the cross-section of the sub-component 76 through the floor 12 to the resin R. This process is referred to herein as "selective" curing. It will be understood that photopolymers undergo degrees of curing, from liquid to gel to solid. In many cases, the radiant energy apparatus 18 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 18 may be carefully selected to partially cure or "under-cure" a previous layer, with the expectation that when the subsequent layer is applied, the energy from that next layer will further the curing of the previous layer. In the process described herein, the term "curing" or "cured" in general may be used to refer to partially-cured or completely-cured resin R. Partially-cured resin refers to a state in which additional photo-initiators are available for further curing. Completely or fully-cured resin refers to a state in which no more photo-initiators are available for further curing and/or where the application of additional thermal or electromagnetic curing energy will not significantly change the cure state of the component. During the curing process, radiant energy may be supplied to a given layer in multiple steps (e.g. multiple flashes) and also may be supplied in multiple different patterns for a given layer. This allows different amounts of energy to be applied to different parts of a layer.

Once curing of the first layer is carried out, the stage 14 is separated from the floor 12, for example by raising the stage 14 using the actuator 32. The cycle of incrementing a layer and selectively curing is repeated until the entire sub-component 76 is complete.

Optionally, the sub-component 76 and/or the stage 14 may be cleaned to remove uncured resin R, debris, or contaminants between curing cycles. The cleaning process may be used for the purpose of removing resin R that did not cure or resin R that did not cure enough to gel during the selective curing step described above. For example, it might be desired to clean the sub-component 76 and/or the stage 14 to ensure that no additional material or material contamination is present in the final sub-component 76. For example, cleaning could be done by contacting the sub-component 76 and/or the stage 14 with a cleaning fluid such as a liquid detergent or solvent (not shown).

Where a scanned beam apparatus is used instead of a projector as seen in FIG. 2, the radiant energy source 62 emits a beam 66 and the beam steering apparatus 64 is used to cure the resin R by steering a focal spot of the build beam 66 over the exposed resin R in an appropriate pattern. The cycle of incrementing a layer is repeated. The radiant energy source 62 again emits a build beam 66 and the beam steering apparatus 64 is used to steer the focal spot of the build beam 66 over the exposed resin R in an appropriate pattern. The exposed layer of the resin R is exposed to the radiant energy which selectively cures resin R as described above and joins it to the previously-cured layer above. This cycle of incrementing a layer and selectively curing is repeated until the entire first sub-component 76 is complete.

Optionally, a scanned beam apparatus may be used in combination with a projector. For example, a scanned beam apparatus may be used to apply radiant energy (in addition to that applied by the projector) by scanning one or multiple beams over the surface of the uncured resin R. This may be concurrent or sequential with the use of the projector.

Either curing method (projector or scanned or a combination) results in a sub-component 76 in which the filler (if used) is held in a solid shape by the partially-cured resin R. This component may be usable as an end product for some conditions. Subsequent to the curing step, the sub-component 76 may be removed from the stage 14.

Regardless of which of the above-described curing methods is used, the curing process is controlled (e.g. by modulating the output of the radiant energy apparatus 18) to produce joint surfaces which are partially cured and are cured to a lesser degree than the remainder of the sub-component 76. More specifically, a degree of cure of the sub-component (excluding the joint surface 88) is configured such that the sub-component 76 will maintain dimensional integrity long enough to go through a secondary curing step (described below). A degree of cure of the joint surface 88 is configured such that (1) the joint surface 88 will maintain dimensional integrity long enough to be joined, and (2) the joint surface 88 will have sufficient photo-initiators available to bond to another joint surface when subjected to the secondary curing step. Stated another way, the joint surface 88 is left in a condition suitable for bonding.

The build process described above is used to produce as many of the sub-components as necessary, each including the joint surfaces with partially-cured resin that has a lower degree of cure than that of the remaining portions of the sub-components. In the illustrated example, the process would be repeated to produce sub-component 76.

Figure 11:
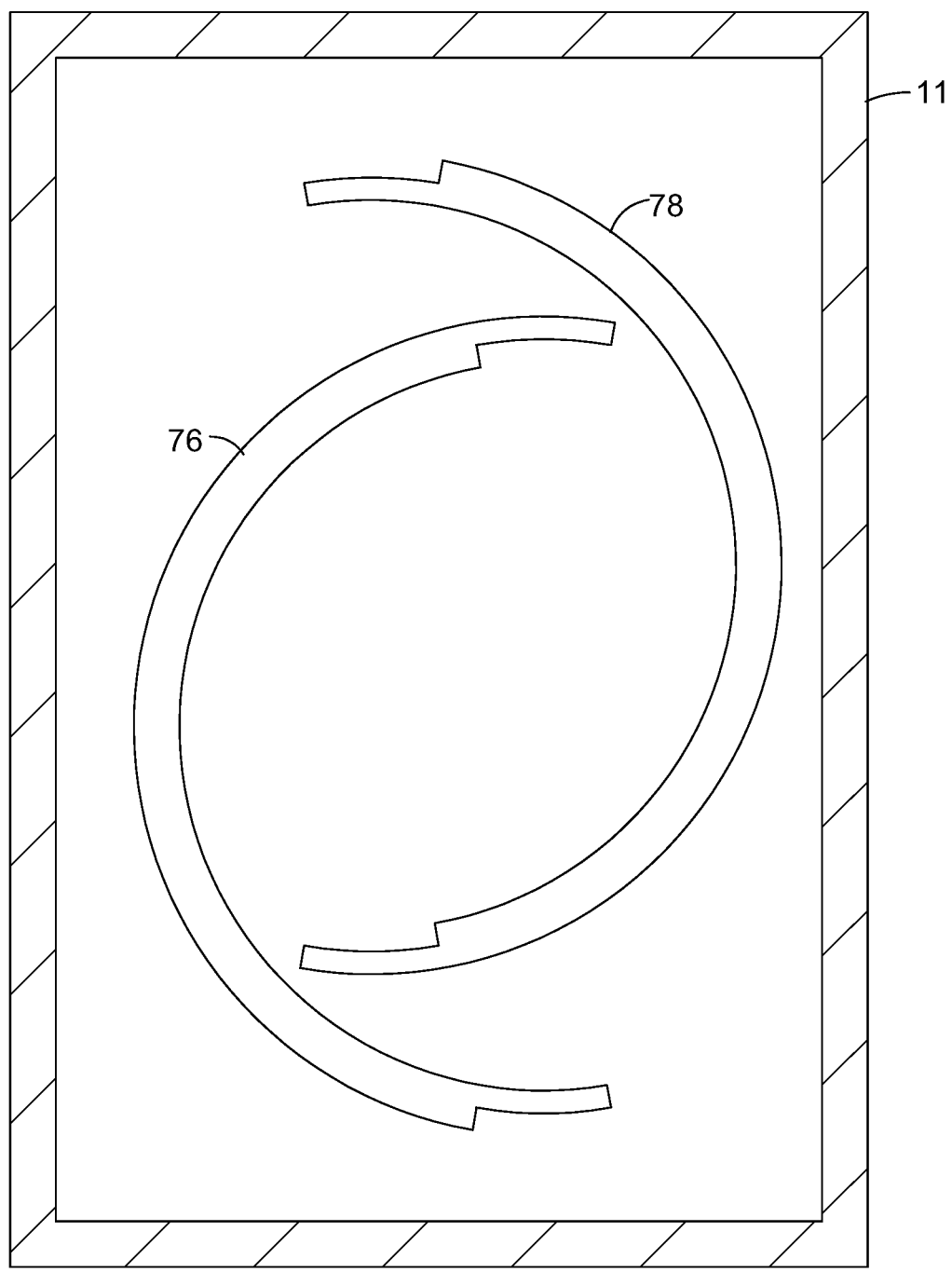
FIG. 11 is a schematic top plan view of an additive manufacturing that showing first and second sub-components superimposed thereupon.

The sub-components 76, 78 could be produced sequentially or separately in individual build cycles, or they could be nested within a build area. For example, FIG. 11 shows a top plan view of a vat 11 with the sub-components 76, 78 laid out in a nested configuration permitting them to be made simultaneously in a single build cycle.

In many cases, the sub-components 76, 78 would be processed in a short timeframe (e.g., within a matter of hours) in order to avoid undesirable results such as degradation of the partially-cured resin. Precautions may be taken to prevent degradation, such as room air filters, UV light filters, and good humidity control. However, it is not deemed to be necessary for the additive manufacturing and subsequent handling to take place in a totally controlled environment such as a glovebox, vacuum chamber, etc.

Figure 12:
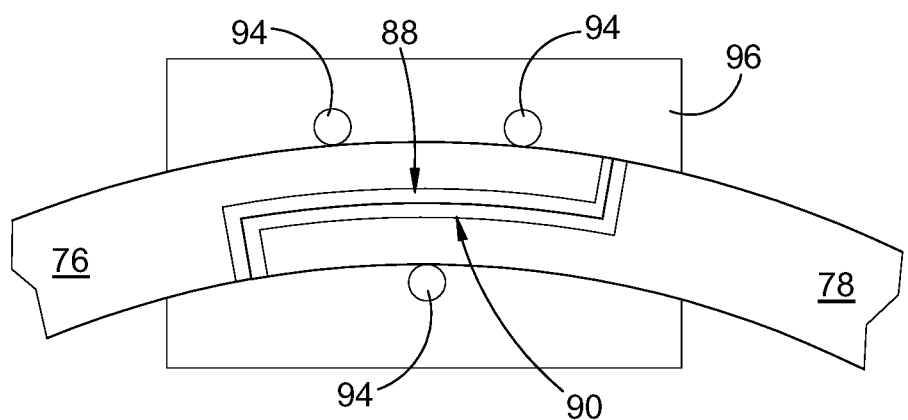
FIG. 12 is a schematic view of a portion of first and second sub-components assembled in preparation for secondary curing process.

The sub-components 76, 78 are then assembled and subjected to a secondary curing process. This process is described with reference to FIGS. 12-14. Initially, the sub-components 76, 78 are positioned with the joint surfaces in mutual contact (joint surfaces 88, 90 are shown as an example). Optionally, the sub-components 76, 78 may be held in position with devices such as clamps or a fixture. FIG. 12 shows a simple fixture comprising a plurality of fixed pins 94 mounted to a base 96. The pins 94 are arranged in a pattern that receives and locates the sub-components 76, 78. The pins 94 or other fixturing element may be made from a radiotransparent material so as to avoid interference with the secondary curing operation.

Figure 13:
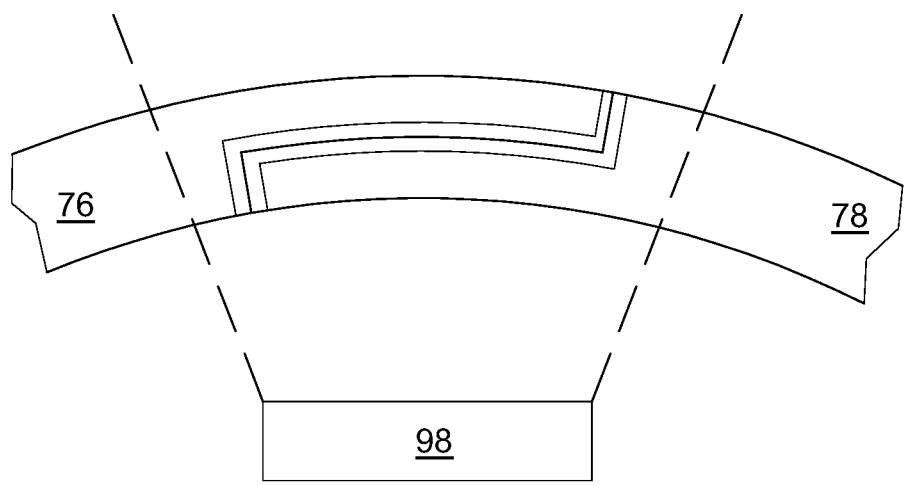
FIG. 13 is a schematic view of the first and second sub-components of FIG. 12 during a secondary curing process.

FIG. 13 shows the fixtured sub-components 76, 78 being subjected to a secondary curing operation via application of radiant energy, such as UV radiation, from a suitable source 98 depicted schematically. In one example, the radiant energy source for the secondary curing process may be nonselective. For example, a simple UV light box or UV handheld light may be used. In another example, the radiant energy source for the secondary curing process may be selective, i.e. a projector or scanned beam apparatus as described above may be used. In another example, the radiant energy source for the secondary curing process may be selective in a gross or coarse aspect, e.g., a UV light could be used combination with one or more actuators, masking devices, reflectors, lenses, beam-forming elements, or similar devices to limit, direct, or scan the radiant energy which is selective to some degree but with less accurate position resolution that the projector or scanned beam devices described above. If a reservoir is used as described above, additional uncured resin R may be placed in the reservoir prior to assembly.

For some resins R, exposure to oxygen has a tendency to inhibit the curing process. Accordingly, the parts may be stored in an oxygen rich environment prior to bonding and the secondary curing step may be carried out in an oxygen-poor environment to promote good bonding and curing.

Figure 15:
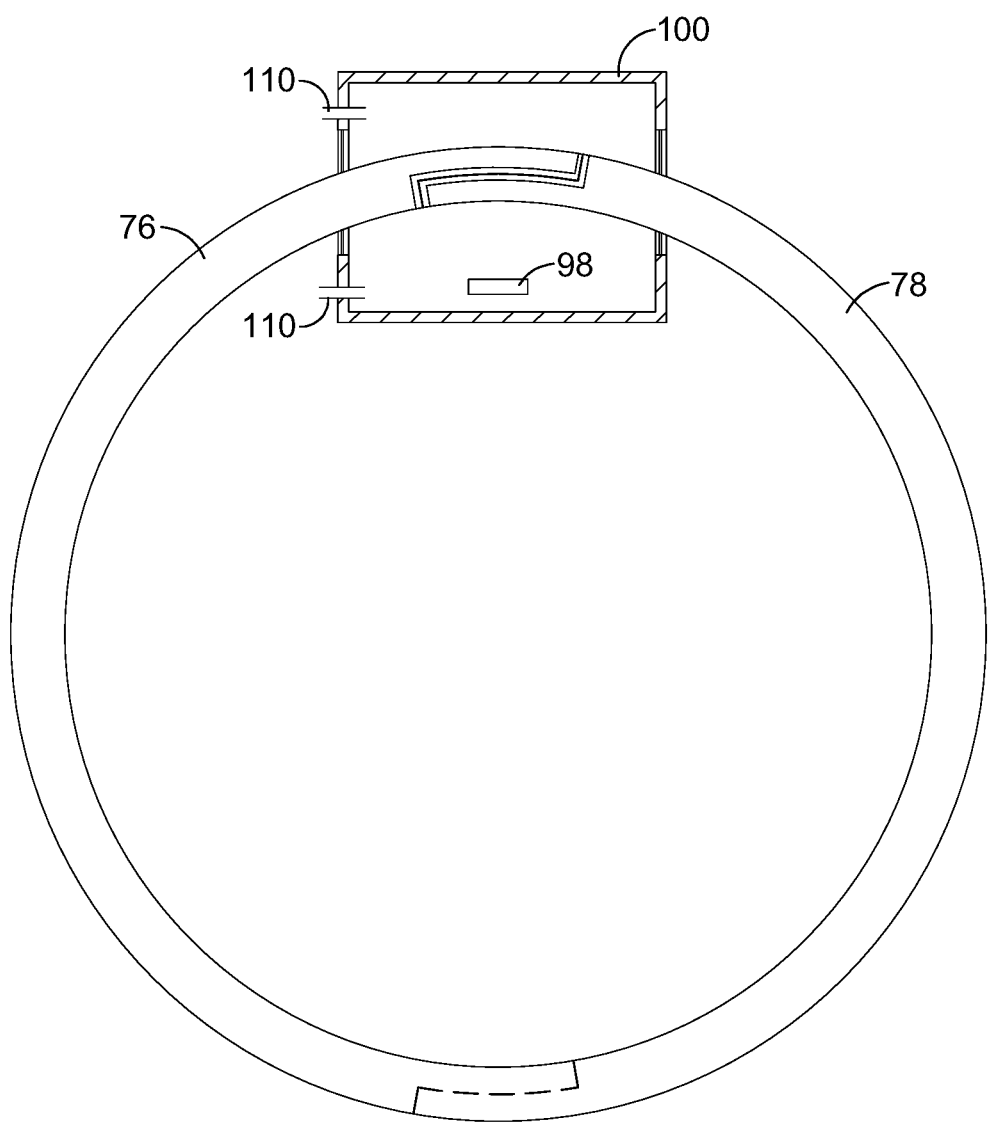
FIG. 15 is a schematic view of first and second sub-components in a curing chamber.

FIG. 15 illustrates an example of a curing chamber 100, which may be used to enclose the sub-components 76, 78 (or portions thereof) to maintain an oxygen-poor environment, defined generally as an environment having an oxygen concentration lower than prevailing room conditions. The curing chamber 100 may be provided with a shielding or inert gas atmosphere using gas ports 110. Optionally, pressure within the curing chamber 100 could be maintained at a desired level greater than or less than atmospheric. Optionally, the curing chamber 100 could be temperature and/or humidity controlled. Optionally, ventilation of the curing chamber 100 could be controlled based on factors such as a time interval, temperature, humidity, and/or chemical species concentration.

Figure 14:
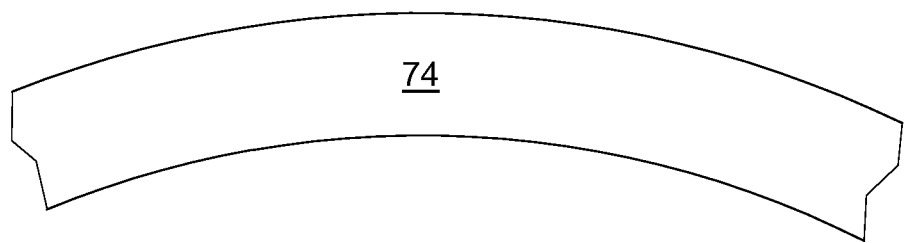
FIG. 14 is a schematic view of the first and second sub-components of FIG. 13 subsequent to completion of the secondary curing process.

The secondary curing process causes the partially-cured resin to further cure, thus bonding the sub-components 76, 78 together at the joint surfaces 88, 90. FIG. 14 shows a portion of the finished component 74, illustrating that the sub-components 76, 78 are essentially merged into one integral, unitary, or monolithic component. It is expected that, when the partially cured joint surfaces are cured in the secondary curing step, little to no dimensional change will take place. Accordingly, the basic accuracy potential of the apparatus 10 and process is maintained when the step of joining is introduced.

The complete process described above (i.e., additive manufacturing, followed by assembling and secondary curing), results in a component 74 in which the filler (if used) is held in a solid shape by the cured resin R. This component 74 may be usable as an end product for some conditions.

If the end product of the assembled components is intended to be composed of the filler (e.g. purely ceramic, glass, metallic, diamond, silicon, graphite, etc.), the component 74 may be treated to a conventional sintering process to burn out the resin R and to consolidate the ceramic or metallic particles. Optionally, a known infiltration process may be carried out during or after the sintering process, in order to fill voids in the component with a material having a lower melting temperature than the filler. The infiltration process improves component physical properties.

The method described herein has several advantages over the prior art. In particular, it provides a capability for manufacturing components that are larger than a machine's build zone while maintaining a desired degree of accuracy.

The foregoing has described a method for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for making a component, comprising the steps of:
   producing at least one software build geometry representing two or more sub-components, each of the sub-components having joint surfaces configured for mutual engagement, wherein producing the at least one software build geometry comprises:
      analyzing a component software model representing the component to determine one or more joint surfaces along which the component software model will be divided and rejoined, wherein the analysis includes at least one of:
         determining an orientation of a secondary curing operation based on a direction from which radiant energy will be delivered to the joint surfaces; or
         determining a penetration distance within the sub-components of a radiant energy of the secondary curing operation and determining a positioning of the joint surfaces so as to be within the penetration distance of the radiant energy of the secondary curing operation;
   producing each sub-components using an additive manufacturing process in which a resin, which is radiant-energy-curable, is partially cured using a selective application of radiant energy, following the at least one software build geometry, wherein the joint surfaces of each sub-component include partially-cured resin which is cured to a lesser degree than the remainder of the respective sub-component, so as to leave the joint surfaces in a condition suitable for bonding;
   assembling the sub-components with their respective joint surfaces in mutual contact; and
   carrying out the secondary curing operation using an application of radiant energy to bond the sub-components at the joint surfaces, thereby forming the component.

2. The method of claim 1 wherein the secondary curing operation uses a nonselective application of radiant energy.

3. The method of claim 1 wherein the step of producing the at least one software build geometry further comprises:
   based on the analysis of the component software model, translating the component software model into at least one sub-component software model representing two or more sub-components; and
   translating the at least one sub-component software model into the at least one software build geometry.

4. The method of claim 1 wherein the sub-components are produced sequentially.

5. The method of claim 1 wherein two or more of the sub-components are produced simultaneously in one additive manufacturing apparatus.

6. The method of claim 1 further including forming at least one mechanical joint feature at each joint surface.

7. The method of claim 1 wherein the secondary curing takes place in an oxygen-poor environment.

8. The method of claim 1 wherein the resin includes a particulate material filler.

9. The method of claim 8 further comprising sintering the component to burn out cured resin and consolidate the filler.

10. The method of claim 9 further comprising infiltrating a material having a lower melting temperature material than the filler into the component during or after sintering.

11. The method of claim 1 further including restraining the sub-components in a fixture prior to the secondary curing operation.

* * * * *